March 2, 1965 P. A. LEE 3,171,179
ADAPTER FOR A WINDSHIELD WIPER
Filed Jan. 24, 1963
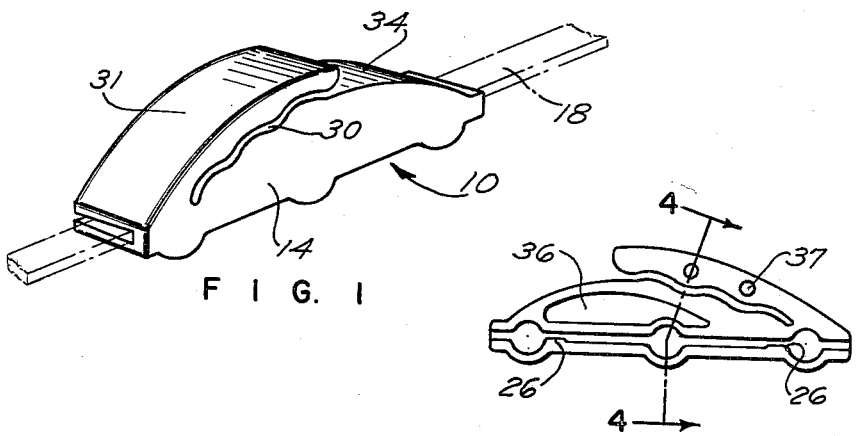
FIG. 1
FIG. 2
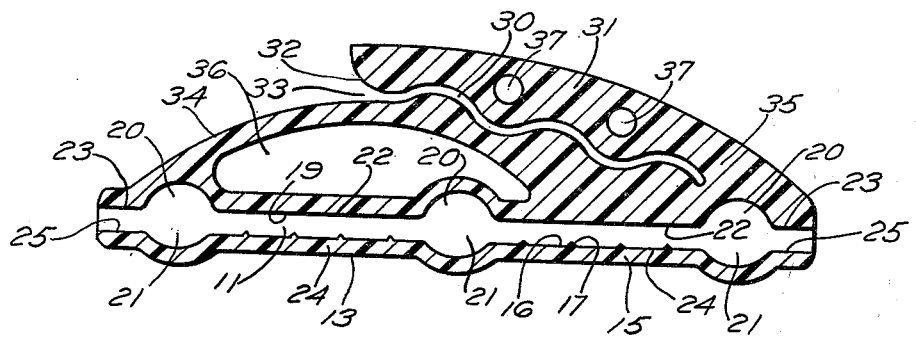
FIG. 3
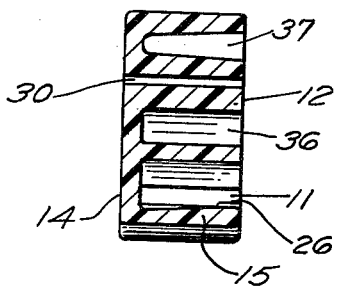
FIG. 4
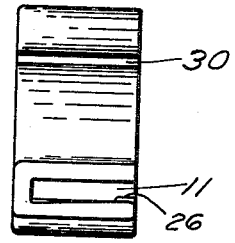
FIG. 5
INVENTOR.
PAUL A. LEE
BY
Barlow & Barlow
ATTORNEYS United States Patent Office 3,171,179
Patented Mar. 2, 1965

3,171,179
ADAPTER FOR A WINDSHIELD WIPER
Paul Alexander Lee, 300 N. State St., Chicago, Ill.
Filed Jan. 24, 1963, Ser. No. 253,637
2 Claims. (Cl. 24—81)

This invention relates to a device for attaching sheet material such as a card or sheet of paper to the windshield wiper of an automobile.

It is quite frequent for attendants of parking lots to attach a card to an automobile by placing the same beneath the windshield wiper, and this is also customary in other instances where it is desired to attach some sheet of paper or the like to the automobile at a position so that the driver will notice the card or paper and remove it from position. This practice of so attaching a card or piece of paper is destructive to the blade of the wiper causing the blade to be roughened or sometimes injured to such an extent that it does not do the proper wiping job for which it is designed.

One of the objects of this invention is to provide a device which may be easily and quickly attached to the arm of a windshield wiper which will afford an easy means of attaching a card or sheet of paper to the wiper without pushing such card or piece of paper beneath the wiping blade, thus preserving the life of the blade and making change less frequent.

Another object of this invention is to provide a device which may be molded in a single piece and thus one which may be made in multiple and inexpensively.

Another object of the invention is to provide a device which will afford an easier means of attaching a card or paper to the windshield wiper such as by one hand, thus eliminating the necessity of using two hands to lift the blade from position and placing the card or paper beneath it.

Another object of the invention is to provide a device which may be made of very lightweight material so that it may remain in position on the windshield wiper while in use and throughout the life of the windshield wiper.

Another object of the invention is to provide a device which may be sufficiently light in weight so that it will not materially affect the life of the windshield wiper.

With these and other objects in view the invention consists of certain novel features of construction as will be more fully described and particularly pointed out in the appended claims.

In the accompanying drawings:

FIG. 1 is a perspective view of the device showing in phantom the arm of the windshield wiper to which it is attached;

FIG. 2 is a side elevation of the device looking at the opposite side from that shown in FIG. 1;

FIG. 3 is a central sectional view on a much larger scale;

FIG. 4 is a section on line 4—4 of FIG. 2; and

FIG. 5 is an end view looking at the opposite end of the device from that shown in FIG. 1.

In proceeding with this invention, I have so formed a structure that it may be molded from plastic or some light material and have also so cut out the different parts that the device will be light in weight.

The device is a single unit all molded in one piece and is provided with a body 10 which is slotted as at 11 from one flat surface 12 thereof. This slot 11 extends sufficiently close to the bottom edge or surface 13 and also extends inwardly sufficiently close to the opposite side surface 14 as to permit of substantial resiliency of the resulting wall 15, the inner surface 16 of which forms the inner wall of the slot 11. On this inner surface 16 styrations or ribs 17 are formed extending at generally right angles to the longitudinal extent of the slot 11 so as to retard slipping of the wiper arm 18 when inserted into the slot. The opposite wall 19 of this slot provides a spacing between the walls 16 and 19 slightly smaller than the thickness of the arm 18 to be gripped so that there will be a slight flexing of the wall 15 as the arm 18 is inserted therein. In order to provide spaced areas of engagement with the arm 18, which are found to be more convenient especially if the arm is not perfectly true, recesses 20 are provided at spaced intervals along the surface 19 and opposite recesses 21 are provided in the surface 16 opposite the recesses 20 so as to cooperate therewith in providing inner lands 22 on the wall 19 and end lands 23 at the ends of the wall 19, while similar inner lands 24 are formed in the walls 16 and end lands 25 at the ends thereof. This slot 11 formed as above described is essentially straight and to further hold the arm 18 tits 26 may be provided inwardly of which the arm 18 normally lies.

In order to provide a means for gripping a cardboard or piece of paper, I have provided another slot 30 in the arcuate outer surface of the body which extends completely through the thickness of the body 10. This slot is not straight but rather is wavy or of an undulated form such as may be best seen in FIG. 3 and thus provides for some distortion of the paper or cardboard which may be inserted therein so as to better hold the same. This slot is essentially provided by an overarm 31 which terminates intermediate the ends of the body and is curved as at 32 so as to provide an entrance mouth 33, while the surface at 34 of the body is curved so that a card or paper may be slid up along this surface 34 and into the mouth and along the undulating slot 30 to position a piece of paper or cardboard therein. The arm 31 may be somewhat resilient by reason of the thickness of the stock as at 35 at the location where it joins the body although the resiliency is not especially dependent upon for holding the card or paper in position but rather the flexure of the paper or card to friction on the walls of the slot affords this holding.

In order to further lighten the structure and maintain a substantially constant cross section of arm 31 for molding purposes, recesses 36 and 37 are provided in the body, the latter two being located in the arm 31. These recesses extend inwardly from the same side of the body as the slot 11, thus enabling them to be cored out in the mold the same as the coring out of the slot 11. A slight taper may be provided on these recesses for withdrawal from the cores of the mold.

From the above it will be apparent that I have provided a very lightweight attachment or adapter for a windshield wiper arm which may remain in place during the life of the arm and to which a piece of paper or cardboard may be readily attached with one hand so that one seeing this device in position recognizes at once that the attachment of a sheet may be much more easily made to this device than to the wiper arm and therefore will attach the cardboard or paper to the device rather than try to lift the blade with the other hand and push the cardboard or paper under the blade.

I claim:

1. An adapter for a windshield wiper comprising a one piece body having opposite generally parallel side surfaces, an outer generally arcuate surface having a resilient gripping arm overlying the same and spaced therefrom by a slot adapted to receive and grip a sheet of material therein and extending from a point intermediate the ends of the body toward one end of the body but terminating short thereof and from one side surface of the body to the other side surface and a bottom surface with a slot extending from one end of the body to the other inwardly from one of said side surfaces to a depth short of the opposite side surface with the opposed walls of the slot spaced substantially uniformly for the depth of the slot to receive an arm of a windshield wiper by laterally positioning the arm in said slot, said slot being at a location with reference to said bottom surface to provide the slot with one resilient wall to resiliently grip said arm.

2. An adapter as in claim 1 wherein the said first mentioned slot is of undulating form.

References Cited in the file of this patent

UNITED STATES PATENTS

| | | |
|---|---|---|
| 2,328,806 | Hoofer | Sept. 7, 1943 |
| 2,805,013 | Comfort | Sept. 3, 1957 |
| 3,040,990 | Gotti | June 26, 1962 |

FOREIGN PATENTS

| | | |
|---|---|---|
| 168,124 | Australia | Oct. 12, 1956 |
| 703,569 | Great Britain | Feb. 3, 1954 |